US006383247B1

(12) United States Patent
Wiechens

(10) Patent No.: US 6,383,247 B1
(45) Date of Patent: May 7, 2002

(54) MICRONUTRIENT-CONTAINING LEAF FERTILIZER BASED ON MAGNESIUM SULFATE AND PROCESS FOR ITS PRODUCTION

(75) Inventor: Bernhard Wiechens, Kasssel (DE)

(73) Assignee: Kali und Salz GmbH, Kassel (DE)

( * ) Notice: Subject to any disclaimer, the term of this patent is extended or adjusted under 35 U.S.C. 154(b) by 0 days.

(21) Appl. No.: 09/346,587

(22) Filed: Jul. 2, 1999

(30) Foreign Application Priority Data

Jul. 4, 1998 (DE) .......................... 198 29 919

(51) Int. Cl.⁷ .................. C05D 5/00; C05D 9/00; C05D 11/00; C05G 5/00
(52) U.S. Cl. ............................. 71/63; 71/64.1
(58) Field of Search ................ 71/31, 63, 64.1

(56) References Cited

U.S. PATENT DOCUMENTS

| 4,299,613 A | * | 11/1981 | Cardarelli | 71/64 F |
| 4,400,374 A | * | 8/1983 | Cardarelli | 424/78 |
| 4,405,360 A | * | 9/1983 | Cardarelli | 71/117 |
| 4,529,434 A | * | 7/1985 | Ashmead | 71/34 |
| RE32,356 E | * | 2/1987 | Cardarelli | 424/78 |

OTHER PUBLICATIONS

Ullmann's Encyclopedia of Technical Chemistry, 4th Edition 1975, vol. 10, p. 206.
Finck, "Dünger und Düngung", Verlag Chemie, Weinheim, New York, 1979, pp. 93 to 105.
Kluge, et al "Das Düngemittel Recht" 1996, Landwirtschaftsverlag GmbH Münster– Hiltrup, pp. 90–98.

* cited by examiner

*Primary Examiner*—Stuart L. Hendrickson
*Assistant Examiner*—Eileen E. Nave
(74) *Attorney, Agent, or Firm*—Collard & Roe, P.C.

(57) ABSTRACT

A micronutrient-containing leaf fertilizer has magnesium sulfate heptahydrate as a carrier material in such an amount that a solid nutrient combination of 13% to 15% by weight MgO, 0% to 3.5% by weight boron, 0% to 6.5% by weight manganese and 10.3% to 14% by weight sulfur is obtained by solely admixing manganese sulfate monohydrate and boric acid with the carrier and this combination being converted into a diluted leaf fertilizer solution by adding water.

7 Claims, No Drawings

MICRONUTRIENT-CONTAINING LEAF FERTILIZER BASED ON MAGNESIUM SULFATE AND PROCESS FOR ITS PRODUCTION

BACKGROUND OF THE INVENTION

1. Field of the Invention

The present invention relates to a micronutrient-containing leaf fertilizer which has magnesium sulfate heptahydrate as a carrier material in such an amount that a solid nutrient combination of 13% to 15% MgO, 0% to 3.5% boron, 0% to 6.5% manganese and 10.3% to 14% sulphur is obtained by solely admixing manganese sulfate monohydrate and boric acid, said combination being converted into a diluted leaf fertilizer solution by adding water.

2. The Prior Art

In addition to the known macronutrients (N, P, K), plant cultures require additional nutrients for their optimal development, in particular the secondary nutrients Mg and S. The secondary nutrients Mg and S are frequently applied as leaf fertilizer in the dissolved form of a bitter salt solution ($MgSO_4 \cdot 7 H_2O$ with 16% MgO and 13% S).

In agricultural practice, leaf fertilization with bitter salt is currently viewed as a good trade practice in order to immediately eliminate time-conditioned situations, such as a lack of these nutrients. This is carried out by directly applying to the leaf relatively small amounts of nutrient. Bitter salt is primarily applied to grains, sugar beets, rapeseed and potatoes.

In addition to these nutrients, other effective trace elements such as Fe, Mn, Zn, Cu, Co, Mo and B, the so-called micronutrients, are indispensably required in small amounts. These trace elements are essential for building up enzyme systems within plant cells and are frequently not available in adequate amounts. An inadequate supply of one of these micronutrients leads to depressed plant growth due to insufficiency diseases in the plant. The demand for the last-mentioned elements is directly connected with the amount of fertilization with macronutrients. The better the plants are supplied with N, P, K, Ca and Mg, the greater the demand for trace elements. However, if the optimal dosage is exceeded, that may lead to damage and diminished plant growth as well. (*Ullmann's Encyclopedia of Technical Chemistry*, 4th edition 1975, vol. 10, page 206).

The following cultivated plants primarily require a controlled supply of micronutrients while the plants are growing. Sugar beets, rapeseed and grapes need to be supplied with boron and manganese, while grains and potatoes need manganese.

It is known to use micronutrient fertilizer as a single-trace nutrient fertilizer and as a multi-trace nutrient fertilizer. The nutritive elements are absorbed as cations or a metal chelate, because they are predominantly heavy metals. Boron is an exception, which is absorbed in the anionic form as borate. Known single-trace nutrient fertilizers are, for example:

Fe as iron ethylene diamine tetraacetate (Fe-EDTA—commercial product: Fetrilon®
Mn as manganese sulfate $MnSO_4 \cdot 4 H_2O$, or $MnSO_4 \cdot H_2O$
Zn as zinc sulfate $ZnSO_4 \cdot 7 H_2O$, or $ZnSO_4 \cdot H_2O$
Cu as copper chelate
Co as cobalt chelate
Mo as a mixture of sodium molybdate and ammonium molybdate
B for example as sodium tetraborate or boric acid.

The single-trace nutrient fertilizers specified above by way of example all can be used as leaf fertilizers in their form dissolved in water (Finck: *Dünger und Düngung* (*Fertilizers and Fertilization*), Verlag Chemie Weinheim, New York, 1979, pp 93–105, as well as "Das Düngemittelrecht" 1996 (The Fertilizer Law), pp 90–98, *Landwirtschaftsverlag GmbH Münster-Hiltrup*).

Furthermore, it is known to apply these single micronutrient fertilizers in various combinations as trace nutrient mixed fertilizers, which offer the advantage of a broader effective spectrum.

The known leaf fertilizers with trace elements in the combination of their totality frequently contain a combination of the most important main nutrients N+K.

Furthermore, a water-soluble combination of several micronutrients with the secondary nutrients magnesium and sulfur is know as leaf fertilizer (Finck: loc. cit., page 125). This fertilizer represents a further development of the aforementioned Fe-chelate fertilizer. However, the secondary nutrient Mg, which is specified as MgO-content, is not used in the form of $MgSO_4$, so that no adequate supply of sulfur is provided at the same time.

Trace nutrient combinations based on chelate are frequently produced as solutions, i.e. in the presence of water. They are subsequently transformed, for example by spray drying or evaporative crystallization into products with good solubility in water and flowability. However, drawbacks may occur in that these salt mixtures separate if the components have different densities and grain sizes, or phenomena of baking may appear.

The known fertilizers do not provide a simultaneous controlled supply with magnesium, sulphur, boron, and manganese as is required particularly for sugar beets and rapeseed.

SUMMARY OF THE INVENTION

It is an object of the present invention to develop a solid and storable, and highly water soluble, leaf fertilizer which, on the basis of a magnesium component as carrier, assures a controlled supply of cultivated plants with the secondary nutrient sulphur and at the same time with the micronutrients manganese and boron.

According to the invention, the sulfate salt of magnesium is used in the form of the heptahydrate, namely bitter salt as the carrier. As compared to the known trace nutrient fertilizers, the secondary nutrient component is formed by a component of at least 80% by weight bitter salt, which corresponds with a content of secondary nutrients of at least 13% by weight MgO and 10.3% by weight S. It was found in this connection that the trace nutrient carriers boric acid ($H_3BO_3$) and manganese sulfate monohydrate ($MnSO_4 \cdot H_2O$), which are individually known per se, are very highly miscible with the Mg bitter salt carrier. Also, the nutrient combination as defined by the invention can be transformed into a clear aqueous solution without sediment with contents in the mixed product of 13% to 15% by weight MgO, 0% to 6.5% by weight Mn, 0% to 3.5% by weight B, as well as 10.3% to 14% by weight S.

All percents by weight are based upon the total fertilizer composition weights for the dry fertilizer.

The weight % Mn can range from 0.95% to 6.5% and the weight % B can range from 0.95% to 3.5%.

The maximum contents of B, Mn and S are obtained only, on the precondition that Mn is present as monosulfate and B is present as boric acid if maximally 80% by weight of the composition is formed by bitter salt. The aqueous concentration of the solid solute in the solution to be produced can be adjusted from 1% to up to 10% by weight, preferably 3% to 7% by weight by adding water.

For the aqueous solution, all percents are by weight based upon the total solution weight.

An adequate supply of nutrients may be provided even by only one application, or by repeated batchwise application if a product with 15% MgO, about 1% B and about 1% Mn as well as 12.5% S is used as a 5% aqueous solution containing 5% fertilizer and 95% by weight of water.

For producing the micronutrient-containing leaf fertilizer, the mixing vessel is first loaded with the bitter-salt carrier component in the amount required for producing the desired content of nutrients. The carrier is used in a dry, granular and flowable form. The dry and granular trace nutrient supply components are then metered in and intensively mixed in the amounts required for producing the desired content of the nutrient. For producing the finished leaf fertilizer in the applicable form, the storable granular fertilizer composition is transformed in a mixer into a clear and stable leaf fertilizer solution that is free of precipitation or of sediment. This is done by adding water in the amount required for achieving the necessary concentration.

Other objects and features of the present invention will become apparent from the following detailed description considered in connection with the accompanying examples which discloses several embodiments of the present invention. It should be understood, however, that the examples are designed for the purpose of illustration only and not as a definition of the limits of the invention.

DETAILED DESCRIPTION OF PREFERRED EMBODIMENTS

EXAMPLE 1

About 18.3 kg by weight bitter salt was mixed with 0.6 kg of manganese sulfate hydrate and 1.1 kg of boric acid and transformed in a mixer into an aqueous 5% clear and sediment-free leaf fertilizer solution by adding water. 400 liters of fertilization solution were obtained, which were applied to agricultural acreage according to the following fertilization recommendation per hectare in Table 1 (1 hectare (ha)=2.4711 acres).

Nutrient contents: 15% by weight MgO, 12.5% by weight S, 0.95% by weight B, 0.95% by weight Mn.

TABLE 1

| Recommendation for the leaf fertilization of sugar beets with adequate soil supply (Stage C) | | Yield with the product (at 400 liters/hectare with 5% concentration) |
|---|---|---|
| MgO | 2–3 kg/hectare | 3.00 kg |
| S | 2–3 kg/hectare | 2.50 kg |
| B | 0.1–0.2 kg/hectare | 0.19 kg |
| Mn | 0–0.2 kg/hectare | 0.19 kg |

EXAMPLE 2

In the event of insufficiency symptoms in the plant (sugar beets), the leaf fertilizer solution according to Example 1 can be applied in a number of batchwise applications in Table 2.

TABLE 2

| In the event of lack in the soil or visible insufficiency symptoms on the plants and sugar beets | | Yield with the product (at 400 liters/hectare with 5% concentration) |
|---|---|---|
| MgO | 4–10 kg/hectare | 9.00 kg |
| S | 4–10 kg/hectare | 7.50 kg |
| B | 0.4–1.2 kg/hectare | 0.57 kg |
| Mn | 1–2 kg/hectare | 0.57 kg |
| To be applied in a number of batchwise applications | | With 3-times application |

EXAMPLE 3

About 15.9 kg of bitter salt was mixed with 4.1 kg of boric acid and transformed according to Examples 1 and 2 into an aqueous 5% leaf fertilizer solution in Table 3 by adding water.

Nutrient contents: 13% by weight MgO, 10.3% by weight S, 3.5% by weight B

TABLE 3

| In the event of lack of boron on sugar beets | | Yield with the product (at 400 liters/hectare with 5% concentration) |
|---|---|---|
| MgO | 2–3 kg/hectare | 2.60 kg |
| S | 2–3 kg/hectare | 2.06 kg |
| B | 0.4–1.2 kg/hectare | 0.70 kg |

EXAMPLE 4

About 18.3 kg of bitter salt was mixed with 1.7 kg of manganese sulfate hydrate and was transformed according to the above examples into an aqueous 5% leaf fertilizer solution in Table 4 by adding water.

Nutrient contents: 15% by weight MgO, 13.5% by weight S, 2.7% by weight Mn

TABLE 4

| In the event of lack of Mn in grains | | Yield with the product (at 400 liters/hectare with 5% concentration) |
|---|---|---|
| MgO | 2–3 kg/hectare | 3.00 kg |
| S | 2–3 kg/hectare | 2.70 kg |
| Mn | 0.4–2.0 kg/hectare | 0.54 kg |

Accordingly, while a few embodiments of the present invention have been shown and described, it is to be understood that many changes and modifications may be made thereunto without departing from the spirit and scope of the invention as defined in the appended claims.

What is claimed is:

1. A micronutrient-containing leaf fertilizer based on magnesium sulfate, comprising
   magnesium sulfate heptahydrate as a carrier;
   said carrier being present in such an amount that a solid nutrient combination of 13% to 15% by weight of MgO, 0% to 3.5% by weight of B, 0% to 6.5% by weight of Mn and 10.3% to 14% by weight of S is obtained by solely admixing manganese sulfate monohydrate and/or boric acid with said carrier; and
   all percents by weight are based upon the total weight of the fertilizer.

2. The micronutrient-containing leaf fertilizer according to claim 1, wherein there is 15% by weight of MgO.

3. The micronutrient-containing leaf fertilizer according to claim 1, wherein there is from 0.95% to 6.5% by weight of Mn.

4. The micronutrient-containing leaf fertilizer according to claim 1, wherein there if from 0.95% to 3.5% by weigh of B.

5. The micronutrient-containing leaf fertilizer according to claim 1, wherein there is from 0.95% to 3.5% by weight of B; and there is from 0.95% to 6.5by weight of Mn.

6. An aqueous liquid fertilizer solution comprising from 1% to 10% by weight of the micronutrient-containing leaf fertilizer according to claim 1, as a residue free, sediment free, clear solution;

from 90% to 99% by weight of water; and all percents by weight are based on the total weight of the solution.

7. The aqueous liquid fertilizer solution according to claim 6, where the solution has a concentration of fertilizer of from 3% to 7% by weight.

* * * * *